March 18, 1958  J. A. FINGERETT ET AL  2,827,608
MAGNETIC AMPLIFIERS

Filed Dec. 1, 1955  3 Sheets-Sheet 1

INVENTOR.
JOSEPH A. FINGERETT
FRANK A. HILL
BY
*Theodore H. Lassagne*
ATTORNEY

March 18, 1958

J. A. FINGERETT ET AL

2,827,608

MAGNETIC AMPLIFIERS

Filed Dec. 1, 1955

*INVENTOR.*
JOSEPH A. FINGERETT
FRANK A. HILL
BY
*Theodore H. Lascagne*
ATTORNEY March 18, 1958 J. A. FINGERETT ET AL 2,827,608
MAGNETIC AMPLIFIERS
Filed Dec. 1, 1955
3 Sheets-Sheet 3

FIG. 4

INVENTOR.
JOSEPH A. FINGERETT
FRANK A. HILL
BY
*Theodore H. Lusagne*
ATTORNEY

United States Patent Office 2,827,608
Patented Mar. 18, 1958

2,827,608

MAGNETIC AMPLIFIERS

Joseph A. Fingerett, Pacoima, and Frank A. Hill, Van Nuys, Calif., assignors to Librascope, Incorporated, Glendale, Calif., a corporation of California Application December 1, 1955, Serial No. 550,347

13 Claims. (Cl. 323—89)

This invention relates to magnetic amplifiers and more particularly to magnetic amplifiers for insuring the production of an output pulse in each half cycle of line voltage and for an optimum period of time in each half cycle. The invention is especially adapted to be used with ultrafast magnetic amplifiers where an output pulse is produced in each half cycle of line voltage in response to a signal pulse occurring within the same half cycle.

Various types of signal amplification have been used. One type uses magnetic principles to produce signal gain in accordance with the occurrence of core saturations. In such amplifiers, saturable cores are paired and the input signals are applied to the cores to produce a separation in the times that the cores become saturated. An output signal is produced by the amplifier stage after one of the cores in a pair becomes saturated and until the other core in the pair becomes saturated.

Until recently, one problem in magnetic amplifiers has been that the output signals have not been produced in the same half cycle of line voltage as the input signal. This has been undesirable since it tends to slow down the response of the amplifier and to introduce errors in the response of the output member such as the guided missile.

In co-pending application Serial No. 412,796, filed February 26, 1954, by Joseph A. Fingerett and Frank A. Hill, a magnetic amplifier is disclosed and claimed which produces an output pulse in the same half cycle of line voltage as the input pulse. The magnetic amplifier produces an output signal in each half cycle of line voltage. An output signal is produced for an input signal of any polarity and is provided with a polarity and other characteristics corresponding to those of the input signal.

This invention also provides a magnetic amplifier for producing an output signal in each half cycle of line voltage in accordance with the polarity and other characteristics of the input signal. The amplifier includes features for producing the output signal for an optimum period in each half cycle so that none of the input signal becomes lost. This is especially important when the signal has a small duration or a small amplitude since in such cases the whole input signal could easily be lost. By producing an output signal for an optimum period in each half cycle, a maximum amplification of the input signal is obtained.

Each of the embodiments of the invention disclosed herein includes a first pair of saturable cores forming a part of a main amplifier and a second pair of saturable cores forming a part of a switching amplifier. Line windings are wound on the cores in the switching amplifier and in the main amplifier for the introduction of alternating line voltage from a source. This voltage produces a saturation of the cores first in one direction and then in the other direction in successive half cycles of line voltage.

Means are also provided to obtain a saturation of one of the cores in the switching amplifier before any of the other cores. These means include shunt paths connected across the line windings of the switching amplifier in one embodiment and control windings disposed on the cores of the switching amplifier in the other embodiment. By providing such means, one of the cores in the switching amplifier receives a prior saturation for alternating line voltages of positive polarity and the other core in the switching amplifier receives a prior saturation for alternating line voltages of negative polarity.

An input signal is adapted to be introduced to input windings wound differentially on the cores of the main amplifier. This signal causes the two cores in the main amplifier to saturate at different times in each half cycle of line voltage. The two cores in the main amplifier saturate at different times because of the differential relationship of flux produced in the cores by the current flowing through the input windings. An output signal is produced during the time in each half cycle of line voltage when one of the cores in the main amplifier has become saturated and until the time that the other core in the amplifier becomes saturated. By insuring that one of the cores in the switching amplifier becomes saturated before either of the cores in the main amplifier, none of the input signals is lost in the production of an output signal. This is especially important when the input signals have a low amplitude or a short duration.

Figure 1:
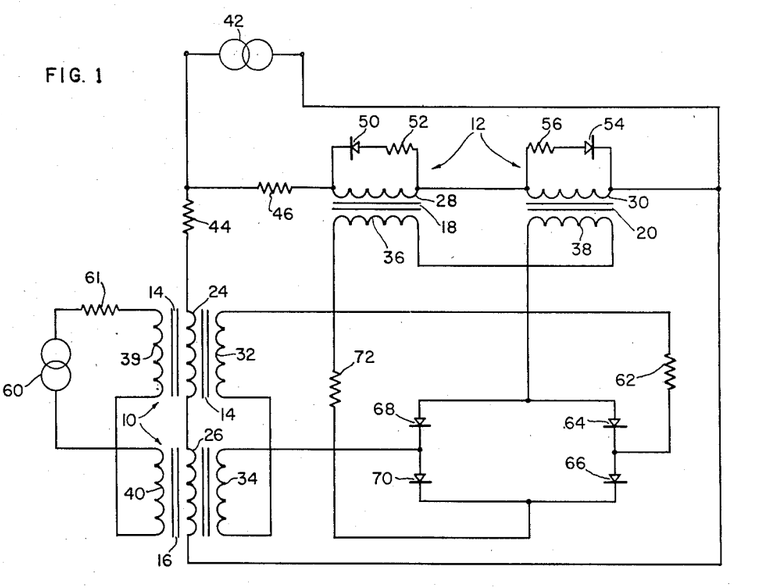
Figure 1 is a circuit diagram illustrating one embodiment of a magnetic amplifier constituting this invention.

In one embodiment of the invention, a main amplifier generally indicated at 10 and a switching amplifier generally indicated at 12 are provided. The main amplifier includes a pair of cores 14 and 16 and the switching amplifier includes a pair of cores 18 and 20. Each of the cores 14, 16, 18 and 20 may be made from a suitable material having saturable magnetic properties such as will be described in detail subsequently. For example, the cores may be made from a material manufactured by Magnetics, Inc. of Butler, Pennsylvania, and designated as "Orthonol" by that company. The particular cores used may be purchased from Magnetics, Inc. by their trade number 50041–4A. The core material is composed of approximately fifty per cent nickel and fifty per cent iron and is made from material which is rolled only in a particular direction and which is annealed in hydrogen to grain orient the material. The cores 14, 16, 18 and 20 may be provided with a suitable shape such as a toroid to obtain a complete path for the travel of the magnetic flux through the cores without any interruption in the material.

Suitable windings are disposed in magnetic proximity to the cores 14, 16, 18 and 20. For example, line windings 24, 26, 28 and 30 are magnetically associated with the cores 14, 16, 18 and 20 respectively. For optimum coupling with their associated cores, the windings 24, 26, 28 and 30 are preferably formed from a plurality of turns which loop the associated cores. For example, each of the windings 24, 26, 28 and 30 may be formed from approximately 2500 turns of Number 42 wire.

Output windings indicated at 32, 34, 36 and 38 are also magnetically associated with the cores 14, 16, 18 and 20, respectively. The output windings 32, 34, 36 and 38 are preferably formed from a plurality of turns which loop their associated cores to produce an optimum magnetic coupling with the cores. For example, each of the windings 32, 34, 36 and 38 is formed from approximately 1600 turns of Number 38 wire.

In addition to the line and output windings, input windings 39 and 40 are respectively disposed in magnetic proximity to the cores 14 and 16 forming a part of the main amplifier 10. The windings 39 and 40 are preferably formed from a plurality of turns of wire which loop the associated cores. For example, each of the windings 39 and 40 may be formed from approximately 300 turns of Number 42 wire.

A source 42 of alternating line voltage is adapted to supply cyclic energy to the line windings 24, 26, 28 and 30. The alternating line voltage from the source 42 may have a suitable frequency such as 60 cycles and a suitable peak amplitude such as 6.3 volts. It should be appreciated, however, that the magnetic amplifier shown in Figure 1 will operate satisfactorily with variations in the frequency, peak amplitude and wave shape. These variations may result from varying loads applied to the source at different times of the day. For example, the load may be heavier in the middle of the afternoon than it is at midnight.

The line windings 24 and 26 are connected in a series circuit with the source 42 and with a resistance 44 having a suitable value such as approximately 400 ohms. Similarly, the windings 28 and 30 form a series circuit with the source 42 and with a resistance 46 having a value corresponding substantially to that of the resistance 44.

The line windings 28 and 30 in the switching amplifier 12 are shunted for reasons which will be described in detail subsequently. Each of the shunt paths includes a uni-directional member such as a diode. For example, the unidirectional members may be diodes such as germanium diodes manufactured by the General Electric Company and other suppliers, and designated as "IN 93" by General Electric.

The shunt path across the line winding 28 may be formed by a diode 50 and a resistance 52 in series. The cathode of the diode 50 is connected to the left terminal of the winding 28 as seen in Figure 1 and the plate of the diode is connected to the resistance 52. Similarly, a diode 54 and a resistance 56 are in series across the line winding 30. The plate of the diode 54 may have a common terminal with the resistance 56 and the cathode of the diode may have a common connection with the right terminal of the winding 30 as seen in Figure 1. Each of the resistances 52 and 56 may have a suitable value such as approximately 10,000 ohms.

The input windings 39 and 40 are connected in series with a source 60 of signal energy and a resistance 61. The windings 39 and 40 are connected to the source 60 on a differential basis relative to the connections to the line windings 24 and 26. In other words, the winding 39 introduces energy of one polarity from the source 60 to the core 14 and the winding 40 introduces energy of opposite polarity from the source 60 to the core 16.

The output windings 32, 34, 36 and 38 are connected in an output circuit including a plurality of unidirectional members and a load. The output windings 32 and 34 are connected in the output circuit on a differential basis relative to the connections to the line windings 24 and 26. Similarly, the output windings 36 and 38 are connected in the output circuit on a differential basis relative to the connections to the line windings 28 and 30. In this way, any current flowing through the windings 32, 34, 36 and 38 tends to produce magnetic fluxes in the cores 14 and 18 opposite to the polarity of the fluxes produced in the cores 16 and 20.

The output windings 32 and 34 are connected on a differential basis by providing the lower terminals of the windings in Figure 1 with a common connection. The upper terminal of the winding 32 is connected to one terminal of a load such as a resistance 62 of approximately 1000 ohms. The other terminal of the resistance 62 is connected to one terminal of a first unidirectional member and to the opposite terminal of a second unidirectional member. When diodes are used, the resistance 62 has a common terminal with the cathode of a diode 64 and the plate of a diode 66.

The upper terminal of the winding 34 is connected to the cathode of a diode 68 and the plate of a diode 70. These diodes correspond in construction and operation to the diodes 64 and 66. Connections are made from the plates of the diodes 64 and 68 to the left terminal of the output winding 38 as seen in Figure 1. The right terminal of the winding 38 has a common connection with the right terminal of the winding 36 to produce the differential operation of the windings as described above. A load such as a resistance 72 is connected between the left terminal of the winding 36 in Figure 1 and the cathodes of the diodes 66 and 70. The resistance 72 may have a suitable value such as approximately 1000 ohms. As will be described in detail subsequently, the windings 36 and 38, the resistance 72 and the diodes form a circuit for controlling the delivery of output current to the load 62.

It is well known that magnetic cores produce a changing magnetic flux when a voltage is applied to a winding supported on the core. If a voltage is applied to the winding for a sufficient period of time, the core may become magnetically saturated. The core becomes negatively magnetically saturated when a voltage of a first polarity is applied to the winding on the core for a particular period of time. The core becomes positively saturated when the same voltage of the opposite polarity is applied to the winding for the same length of time.

During the time that a core is not saturated, it produces increasing amounts of magnetic flux, as a voltage of one polarity is applied. For certain core materials such as that used in the cores of this embodiment, small increases in current may cause large increases in the rate of change of magnetic flux. Since increases in the rate of change of flux are equivalent to electromotive force— in other words, voltage—a large increase in voltage can be produced by a small increase in current (incremental magnetizing current) when the core remains unsaturated. This may be seen by the steep sides of the curve shown in Figure 2, such sides being designated as 80 and 82. Because of the large increase in voltage required to produce a small increase in current, the impedance presented by the winding may be relatively large during periods of core unsaturation. For example, each of the line windings 24, 26, 28 and 30 may have impedances of approximately 100,000 ohms when their associated cores remain unsaturated.

When a core becomes magnetically saturated, increases in current through its associated winding produce substantially no increase in magnetic flux. Because of the lack of any increase in flux in the core, no voltage is induced in the windings disposed on the core. This may be seen by the horizontally flat portions 84 and 86 in the hysteresis loop shown in Figure 2. Since impedance is represented by the ratio between the voltage and the current, the winding has substantially zero impedance when its associated core becomes saturated. For example, the winding 28 presents a very low impedance when the core 18 becomes saturated.

The performance of a magnetic core at any instant is dependent upon certain characteristics of the core. For example, the performance of the core is dependent, among other factors, upon the cross-sectional area of the core and the magnetic material from which it is made. The characteristics of the core in turn determine how long a period of time is required to change the core from a negative saturation to a positive saturation or vice versa, when a particular voltage is imposed on the winding associated with the core. Increases in voltage result in a decrease in the time required to change the polarity of core saturation. Similarly, increased periods of time are required to saturate a core for decreases in voltage applied to the associated winding.

The combination of voltage and time required to convert a core from one polarity of saturation to the opposite polarity of saturation has been defined as the "volt-seconds capacity" of the core. The term "volt-seconds" can be mathematically described as the integral of voltage with respect to time. Thus, $$\text{Volt-seconds} = \int_0^t V dt$$

where $V$=the voltage at any instant; and $dt$=an infinitesimal increase in time from that instant.

Figure 2:
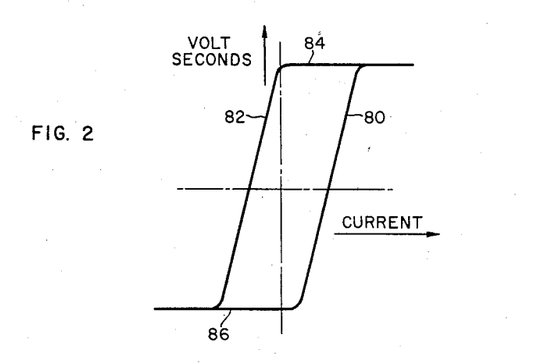
Figure 2 is a hysteresis loop for a typical one of the cores forming a part of the embodiment shown in Figure 1.

Since the volt-seconds level of a core at any instant is dependent upon the value of the volt-seconds which have been applied through an associated winding previous to that instant, the curve shown in Figure 2 represents the relationship between current and volt-seconds. The value of the current is represented along the horizontal axis and the amount of volt-seconds is represented along the vertical axis. As will be seen in Figure 2, the portions 80 and 82 are relatively steep and the portions 84 and 86 are relatively flat such that a response curve approaching a rectangle is produced. Such a response curve is desirable for reasons which will become apparent in the subsequent discussion.

During alternating half cycles, the source 42 of alternate voltage has a positive potential on its left output terminal and a negative potential on its right output terminal as seen in Figure 1. This causes current to flow through a circuit including the source 42, the resistance 46 and the windings 28 and 30. Current flows through the windings in a direction toward the right, as seen in Figure 1. No current is able to flow through the shunt path provided by the diode 50 and the resistance 52, because of the relatively great impedance presented by the diode 50 in the direction from its cathode to its plate. For this reason, substantially all of the current flows through the winding 28.

Since the diode 54 presents a relatively low impedance to the flow of current to the right in Figure 1, the series branch formed by the diode and the resistance 56 effectively shunts the winding 30. The impedance of the shunt path is approximately 10,000 ohms corresponding to the value of the resistance 56. This value is somewhat less than the impedance of approximately 30,000 ohms presented by the winding 30 during the time that the core 20 remains unsaturated. For this reason, most of the current flowing through the winding 28 follows the path provided by the resistance 56 and the diode 54. Only a moderate amount of the current flowing through the winding 28 flows through the winding 30.

Since the winding 28 receives more current than the winding 30 in the positive half cycles of voltage from the source 42, the core 18 tends to become saturated before the core 20. The prior saturation of the core 18 can be considered as being aided in another way by the diode 54 and the resistance 56. By providing the shunt path, the effective impedance produced by the shunt path in parallel with the winding 30 is considerably less than that which would be produced by the winding 30 alone. This effective impedance is in series with the impedance provided by the winding 28. Since this effective impedance is materially less than that of the winding 28, the main portion of the voltage from the source 42 appears across the winding 28 and tends to produce an increased flow of current through the winding. This increased flow of current tends to produce a saturation of the core 18 at an earlier time in each positive half cycle than would be obtained without the inclusion of the shunt path.

The prior saturation of the core 18 in the positive half cycles of voltage from the source 42 is also aided by the operation of the Barkhausen effect. The Barkhausen effect relates to the phenomonena that magnetic cores do not always operate in the same way at different times. For example, the molecules in the core may not be magnetically aligned as well at one instant under a particular set of conditions as at another instant under the same set of conditions. This causes the flux produced by the core to be less at one instant than at another instant. As will be seen, each core has a random voltage variation from a norm in accordance with the operation of the Barkhausen effect.

When variations occur in the core 18 as a result of the Barkhausen effect, the variations in one direction produce a different result than the variations in the other direction. The variations producing a positive voltage on the right terminal of the line winding 28 in Figure 1 tends to produce a flow of current through the winding 52 and the diode 50. This current tends to prevent any build up of positive voltage on the right terminal of the line winding 28. However, any positive voltage produced on the left terminal of the winding 28 tends to build up since current cannot flow toward the right in Figure 1 through the diode 50 and the resistance 52. Because of this build up in voltage, the potential across the winding 28 tends to increase such that an increased current flows through the winding for producing a saturation of the core 18.

The Barkhausen effect has an opposite result when applied to the winding 30. Any positive voltage produced on the left terminal of the winding 30 in Figure 1 tends to produce a flow of current through the resistance 56 and the diode 54. This current prevents any build up of positive voltage on the left terminal of the winding 30. However, any positive voltage produced on the right terminal of the winding 30 by the Barkhausen effect is not dissipated. This results from the fact that current is not able to flow toward the left in Figure 1 through the diode 54 and the resistance 56 because of the high impedance presented by the diode. Since a positive voltage tends to build up on the right terminal of the winding 30 as a result of the Barkhausen effect, the resultant voltage across the winding tends to decrease. This in turn produces a decreased flow of current through the winding 30 such that the temporal separation between the saturations of the cores 18 and 20 becomes further increased.

In the negative half cycles of line voltage from the source 42, current flows toward the left in Figure 1 through the windings 30 and 28. When current flows in this direction, the diode 54 and the resistance 56 have no shunting effect because of the high impedance presented by the diode. However, the shunt provided by the diode 50 and the resistance 52 is effective in reducing the amount of ampere-turns received by the winding 28. This results from various causes, including the Barkhausen effect as discussed above. Because of this, the core 20 becomes saturated before the core 18 in each negative half cycle of line voltage from the source 42. As used in the specification and in the claims, the term "temporal separation" relates to the difference in time between the saturation of one of the cores in a pair and the saturation of the other core in the pair.

During the time that no signal is produced by the source 60, the amount of ampere-turns received by the cores 14 and 16 from the source 42 in each half cycle of voltage is substantially equal. This results from the substantially identical characteristics imparted to the cores 14 and 16 and to the windings 24 and 26 disposed on the cores. Since the cores 14 and 16 have substantially the same amount of volt-seconds applied to them in each half cycle of line voltage, they become saturated at substantially the same instant in the half cycles.

Figure 3A:
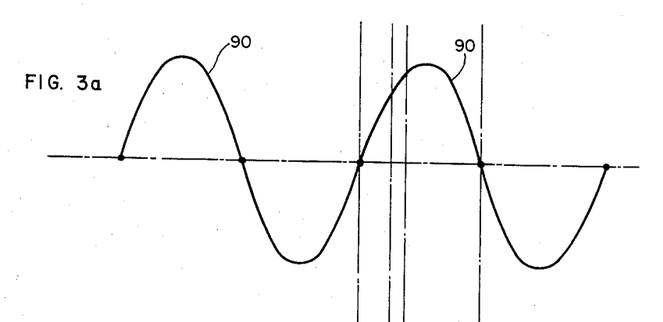
Figures 3a to 3e, inclusive, are representative curves illustrating voltage wave forms at strategic terminals in the magnetic amplifier shown in Figure 1.
Figure 3B:
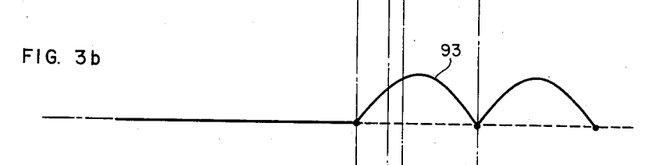
Figure 3C:
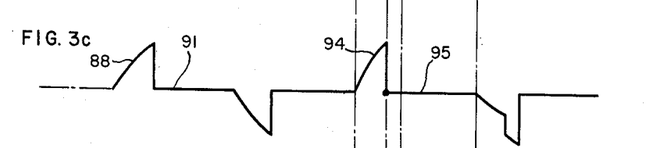
Figure 3D:
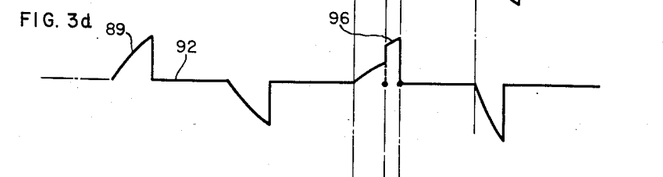

In this way, voltages indicated at 88 and 89 in Figures 3c and 3d are respectively produced across the windings 24 and 26 in the positive half cycles of voltage from the source 42. These positive half cycles of voltage are indicated at 90 in Figure 3a. When the cores 14 and 16 saturate, no voltage is produced across the windings 24 and 26 for the remainder of the half cycle. This is indicated at 91 and 92 in Figures 3c and 3d, respectively.

Upon the application of a signal from the source 60, the volt-seconds applied to the cores 14 and 16 become unbalanced. For example, a signal may be produced by the source 60 such that a positive voltage is produced on the upper terminal of the source in Figure 1 and a negative voltage is produced on the lower terminal of the source. A typical signal is illustrated at 93 in Figure 3b. This signal produces a flow of current through a circuit including the source 60, the resistance 61, the winding 39 and the winding 40. The current flows downwardly through the winding 39 in Figure 1 and upwardly through the winding 40.

When the voltage from the source 42 is positive and the signal from the source 60 is as described in the previous paragraph, the flow of current through the winding 39 is in the same direction as the flow of current through the winding 24. This causes the volt-seconds applied to the core 14 at any instant to be greater than the volt-seconds applied to the core when no current flows through the winding 39. However, the current flowing through the winding 40 is in an opposite direction to that flowing through the winding 26. Because of this, the volt-seconds applied to the core 16 at any instant are less than the volt-seconds which are applied when no current flows through the winding 40.

Since the core 14 receives a greater amount of ampere-turns at any instant than the core 16, as discussed above, it tends to become saturated before the core 16 in the positive half cycles of voltage from the source 42. When the core 14 becomes saturated, the impedance presented to the winding 32 becomes relatively low for reasons described fully above. The signal produced across the winding 24 until the saturation of the core 14 is illustrated at 94 in Figure 3c. Thereafter, substantially no voltage is produced across the winding 24 until the end of the half cycle, as indicated at 95 in Figure 3c. This results from the fact that the saturation of the core 14 causes the impedance presented to the winding 32 to become relatively low. Upon the saturation of the core 14, substantially all of the voltage from the source 42 is presented to the winding 26, as indicated at 96 in Figure 3d.

At the time in the positive half cycles that the core 14 becomes saturated, the core 18 has already become saturated. This results from the fact that the winding 28 receives considerably more ampere-turns than the winding 24 because of the shunt provided by the diode 54 and the resistance 56. At the time that the core 18 becomes saturated in the positive half cycles, the impedance presented by the winding 36 becomes relatively low. When the impedance presented by the winding 36 becomes low, the voltage induced in the winding 38 by the flow of magnetizing current through the winding 30 produces a flow of current through the control circuit. This circuit includes the winding 38, the diodes 64 and 66 or the diodes 68 and 70, the resistance 72 and the winding 36. Current flows through this circuit since the impedance of the winding 36 is negligible and the impedance presented by the diodes 64, 66, 68 and 70 and the resistance 72 is relatively low.

Since the diodes 68 and 70 are in parallel with the diodes 64 and 66, currents having equal amplitudes flow through the diodes 64 and 66 and through the diodes 68 and 70. The currents flowing through the diodes 64 and 68 produce substantially equal voltage drops across the diodes because of the identical characteristics of the diodes. This causes the voltage on the cathode of the diode 64 to be substantially equal to the voltage on the cathode of the diode 68. The equality of voltages on the cathodes of the diodes 64 and 68 indicates that a relatively low impedance exists between these terminals.

As previously stated, the impedance presented by the winding 32 becomes relatively low when the core 14 becomes saturated. Since the impedance between the cathodes of the diodes 64 and 68 is also relatively low at this time, current is able to flow as a result of the voltage induced in the winding 34. The current flows through an output circuit including the winding 34, the diode 70, the resistance 72, the winding 36, the winding 38, the diode 64, the resistance 62 and the winding 32.

Figure 3E:
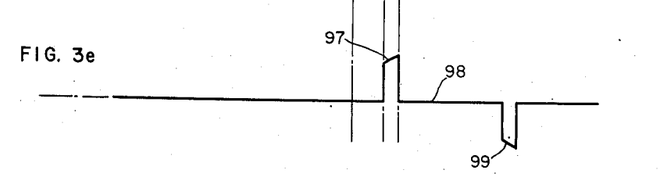

Because of the equal voltages on the plate of the diode 70 and the cathode of the diode 64, the current is limited substantially only by the values of the resistances 62 and 72. This causes the current to have a relatively large amplitude since the resistances 62 and 72 have relatively low values. In this way, a relatively large output voltage is produced across the resistance 62, as indicated at 97 in Figure 3e. The load current continues until the core 16 becomes saturated in the positive half cycles. When the core 16 becomes saturated, the voltage induced in the output winding 34 becomes zero, as indicated at 98 in Figure 3e. This causes substantially all of the voltage from the source 42 to be produced across the resistance 44 during the remainder of the half cycles.

In the negative half cycles of voltage from the source 42, current flows upwardly through the windings 26 and 24 in Figure 1. This causes the current through the winding 26 to be in the same direction as the current through the winding 40 for positive signals from the source 60, one positive signal being illustrated at 93 in Figure 3b. Because of this, the core 16 receives more volt-seconds than the core 14 and saturates before the core 14.

Upon the saturation of the core 16, substantially all of the voltage from the source 42 is developed across the winding 24. Since the core 20 has already saturated for reasons described above, a relatively large current flows through the output circuit and produces a relatively large output voltage across the resistance 62. This output circuit includes the winding 32, the resistance 62, the diode 66, the resistance 72, the windings 36 and 38, the diode 68 and the winding 34. The output current flowing through the resistance 62 in the negative half cycles causes a relatively large output voltage to be produced across the resistance as indicated at 99 in Figure 3e.

In like manner, an output signal is obtained in each half cycle of line voltage when the signal from the source 60 is negative. A negative signal is represented by a relatively high voltage on the lower terminal of the source 60. When a negative signal occurs, the core 16 saturates before the core 14 in the positive half cycles of voltage from the source 42. The resultant flow of current through the load 62 is in a direction to produce a negative voltage across the load. It can also be shown that in the negative half cycles of voltage from the source 42 a positive output signal is developed across the resistance 62 upon the occurrence of a negative signal from the source 60.

Figure 4:
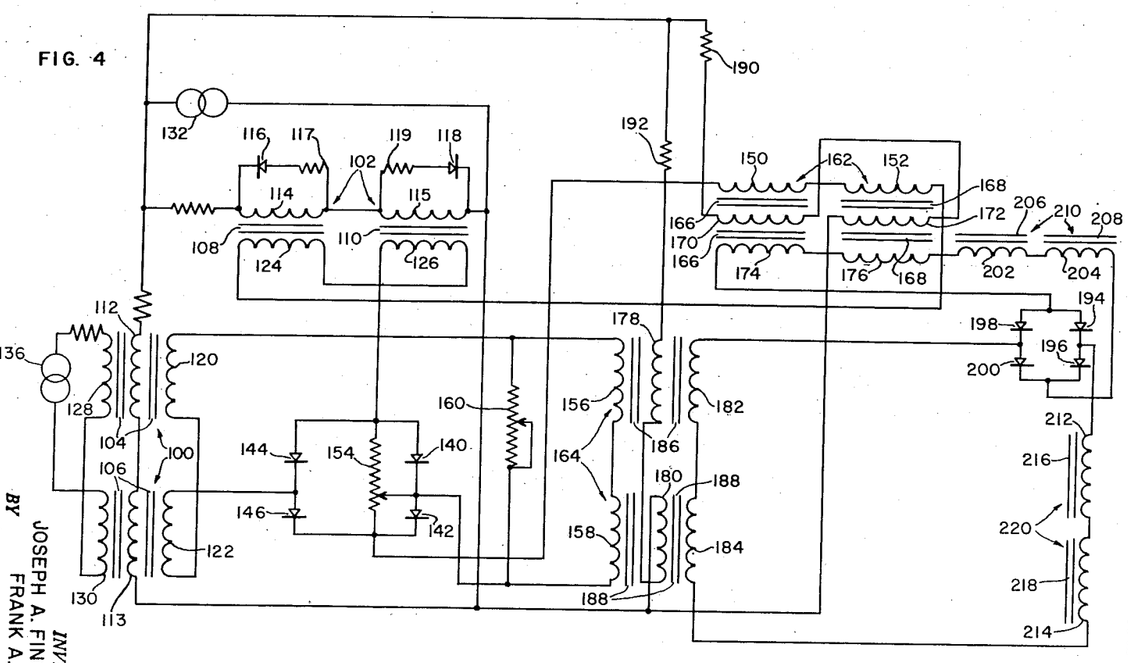
Figure 4 is a circuit diagram illustrating a magnetic amplifier forming another embodiment of the invention.

The embodiment of the invention shown in Figure 4 includes a main amplifier generally indicated at 100 and a switching amplifier generally indicated at 102. These correspond respectively to the main amplifier 10 and the switching amplifier 12 in Figure 1. Cores 104 and 106 form a part of the main amplifier 100 and cores 108 and 110 form a part of the switching amplifier 102. Line windings 112, 113, 114 and 115 and output windings 120, 122, 124 and 126 are respectively wound on the cores 104, 106, 108 and 110. Input windings 128 and 130 are also wound on the cores 104 and 106.

The various line windings disposed on the cores 104, 106, 108 and 110 are adapted to receive voltage from a source 132 of alternating line voltage corresponding to the source 42 in Figure 1. The line voltage applied to the windings 114 and 115 are controlled by shunt paths connected across the windings. These shunt paths correspond to the shunt paths which are shown in Figure 1 and which are described fully above. They include a diode 116 and a resistance 117 connected across the winding 114 and a diode 118 and a resistance 119 connected across the winding 115.

For reasons which will become apparent subsequently, the cores 104, 106, 108 and 110 are adapted to saturate relatively quickly in each half cycle of line voltage from the source 132—or at least slightly faster in each half cycle than the cores which are included in successive stages. The prior saturation of the cores 104, 106, 108 and 110 may be accomplished by making the cores 104, 106, 108, and 110 slightly smaller in dimensions than the cores in later stages. The line windings 112, 113, 114 and 115 may also be provided with a smaller number of turns than the line windings in subsequent stages. It is also possible to introduce to the line windings of the first stage an alternating voltage having higher amplitudes than the amplitudes of the alternating voltage applied to later stages. This may be accomplished by a step-up transformer or by any other suitable means.

The input windings 128 and 130 are connected to a signal source 136 corresponding to the source 60 in Figure 1. The input windings 128 and 130 are connected to the source 136 to introduce energy differentially to the cores 104 and 106 relative to the introduction of energy from the line windings 112 and 113.

The output windings 124 and 126 are connected in a control circuit which includes a plurality of unidirectional members such as diodes 140, 142, 144 and 146. The right terminals of the windings 124 and 126 are connected together to produce a differential operation of the windings relative to the operation of the line windings 114 and 115. The left terminal of the winding 126 is connected to the plates of the diodes 140 and 144. The left terminal of the winding 124 and the cathodes of the diodes 142 and 146 have a pair of control windings 150 and 152 connected in series between them. The control windings 150 and 152 serve as an inductive load just as the resistance 72 in Figure 1 serves as a resistance load.

One stationary contact of a potentiometer 154 has a common terminal with the plates of the diodes 140 and 144 and the other stationary contact of the potentiometer has a common terminal with the cathodes of the diodes 142 and 146. A connection is made from the movable contact of the potentiometer 154 to the cathode of the diode 140 and the plate of the diode 142.

The output windings 120 and 122 are also connected to provide a differential operation relative to the operation of their associated line windings 112 and 113. This differential operation may be provided by connecting the lower terminals of the windings 120 and 122. A connection is made from the upper terminal of the winding 122 to the cathode of the diode 144 and the plate of the diode 146. A pair of input windings 156 and 158 extend electrically in series from the upper terminal of the winding 120 to the cathode of the diode 140 and the plate of the diode 142. A potentiometer 160 is in parallel with the series branch formed by the windings 156 and 158. The movable contact of the potentiometer 160 has a common terminal with one of the stationary contacts.

The windings 150 and 152 are included in a switching amplifier generally indicated at 162 and the windings 156 and 158 are included in a main amplifier generally indicated at 164. The switching amplifier 162 includes cores 166 and 168 magnetically associated with the windings 150 and 152. Line windings 170 and 172 and output windings 174 and 176 are magnetically coupled to the cores 166 and 168, respectively. In like manner, the main amplifier 164 includes a pair of line windings 178 and 180 and a pair of output windings 182 and 184. The windings 156, 178 and 182 are disposed in magnetic proximity to a core 186 and the windings 158 and 180 are disposed in magnetic proximity to a core 188. The cores 186 and 188 are provided with substantially identical characteristics and with characteristics similar to the characteristics of the cores 166 and 168 in the switching amplifier 162.

The line windings 170 and 172 are in a series circuit with the source 132 of cyclic energy and a resistance 190 corresponding in function to the resistance 46 in Figure 1. The line windings 170 and 172 are connected in the circuit to introduce energy differentially to the cores 166 and 168 relative to the introduction of energy from the windings 150 and 152. The line windings 170 and 172 and the cores 166 and 168 are provided with characteristics to produce a saturation of the cores after the saturation of the cores 108 and 110 in the switching amplifier 102. This may be accomplished by increasing the number of turns in each of the windings 170 and 172 or by increasing the amount of material in each of the cores 166 and 168. It may also be accomplished by varying the voltage introduced to the windings 170 and 172 from the source 132 relative to the voltage introduced to the windings 114 and 115 from the source.

The line windings 178 and 180 are also in a series circuit with the source 132 of cyclic energy and with a resistance 192 having a value corresponding to that of the resistance 190. The line windings 178 and 180 are connected to introduce energy differentially to the cores 186 and 188 relative to the introduction of energy from the windings 156 and 158. The line windings 178 and 180 and the cores 186 and 188 are provided with characteristics to produce a saturation of the cores after the saturation of the cores 104 and 106 in the switching amplifier 100.

The output windings 174 and 176 are connected in a control circuit to introduce energy differentially to the cores 166 and 168 when current flows through the control circuit. The energy is introduced differentially to the cores 166 and 168 relative to the introduction of energy from the line windings 170 and 172. The control circuit includes a plurality of unidirectional members such as diodes 194, 196, 198 and 200 connected in an arrangement similar to the diodes 64, 66, 68 and 70 in Figure 1.

In the control circuit, the left terminal of the winding 174 is connected to the plates of the diodes 194 and 198. The right terminal of the winding 174 and the left terminal of the winding 176 have a common terminal. A suitable load is connected between the right terminal of the winding 176 and the cathodes of the diodes 196 and 200. The load may be a suitable resistance such as the resistance 72 in Figure 1, or it may be a pair of control windings 202 and 204 respectively wound on cores 206 and 208. The windings 202 and 204 and the cores 206 and 208 may serve as part of a switching amplifier generally indicated at 210. The cores 206 and 208 and the windings disposed on the cores are provided with characteristics to produce a saturation of the cores after the saturation of the cores 166 and 168 in the previous stage.

The windings 174 and 176 in the switching amplifier 162 and the windings 182 and 184 in the main amplifier 164 are included in an output circuit. Connections are made from the upper terminal of the winding 182 in Figure 4 to the cathode of the diode 198 and the plate of the diode 200. The lower terminal of the winding 182 has a common connection with the upper terminal of the winding 184. A suitable load is connected between the lower terminal of the winding 184 and the cathode of the diode 194 and the plate of the diode 196. The load may be a resistance such as the resistance 62 in Figure 1, or it may be a pair of input windings 212 and 214 respectively coupled magnetically to cores 216 and 218. The cores 216 and 218 and the windings disposed on the cores may be provided with characteristics to saturate the cores after the saturation of the cores 186 and 188 in each half cycle of line voltage. The windings 212 and 214 and the cores 216 and 218 are included in a main amplifier generally indicated at 220.

When the source 132 has a positive potential at its left output terminal, the diode 118 and the resistance 119 operate to shunt the winding 115 so that the winding 114 receives more ampere-turns than the winding 115. This causes the core 108 to saturate before the core 110 and before either of the cores 104 and 106 in the main amplifier 100. This has been described in detail previously.

Upon the saturation of the core 114 in the positive half cycles of voltage from the source 132, the impedance presented by the output winding 124 becomes relatively low. This causes a relatively low impedance to be presented to the flow of current through a circuit including the winding 126, the diodes 140 and 142 or the diodes 144 and 146, the windings 150 and 152 and the winding 124. Current flows through this circuit because of the voltage induced in the winding 126 by the flow of magnetizing current through the line winding 115.

At the same time that current flows through the control windings 150 and 152, current is also flowing through the line windings 170 and 172 associated with the control windings. The current in the line windings 170 and 172 flows through a circuit including the source 132, the resistance 190 and the line windings. The current flowing through the line windings 170 and 172 would tend to produce a simultaneous saturation of the cores 166 and 168 if no current flowed through the windings 150 and 152. However, the flow of current through the control windings 150 and 152 produces an unbalance in core saturations. The reason for this is that volt-seconds are introduced differentially to the cores 166 and 168 from the windings 150 and 152 relative to the introduction of energy from the windings 170 and 172.

Because of the characteristics provided for the various cores and windings in the switching amplifiers 102 and 162, the cores 166 and 168 cannot saturate in each half cycle of voltage before either of the cores 108 and 110. Since the cores 166 and 168 saturate after the cores 108 and 110, the differential introduction of energy to the cores 166 and 168 from the windings 150 and 152 produces a temporal separation in the core saturations.

For positive half cycles, the volt-seconds introduced to the core 166 from the winding 150 is in the same direction as the volt-seconds introduced to the core from the winding 170. However, the volt-seconds introduced to the core 168 from the winding 152 is in an opposite direction to the volt-seconds introduced to the core from the winding 172. This causes the core 166 to saturate before the core 168 in the positive half cycles of voltage from the source 132. The core 168 saturates in each of the positive half cycles before either of the cores 186 and 188 since the latter cores receive energy only from the line voltage until a time after the saturation of the core 166. The positive half cycles of voltage from the source 132 correspond to the half cycles 93 in Figure 3.

In the negative half cycles of voltage from the source 132, the right terminal of the source has a positive potential such that line current flows towards the left through the windings 115 and 114 in Figure 4. When current flows in this direction, the resistance 117 and the diode 116 shunt the winding 114 and cause the amplitude of the current flowing through the winding 115 to be greater than the amplitude of the current flowing through the winding 114. This in turn produces a saturation of the core 110 before the core 108 in the negative half cycles of voltage from the source 132. Upon the saturation of the core 110, current flows through a circuit including the windings 124 and 126, the diodes 140 and 142 or the diodes 144 and 146 and the windings 150 and 152. Current flows through this circuit because of the voltage induced in the winding 124 by the flow of magnetizing current through the winding 114.

The negative line voltage from the source 132 produces a flow of current in Figure 4 towards the right through the winding 172 and towards the left through the winding 170. This causes the windings 152 and 172 to introduce volt-seconds of the same polarity to the core 168 but the windings 150 and 170 to introduce volt-seconds of opposite polarity to the core 166. For this reason, the core 168 saturates before the core 166 in the negative half cycles of voltage from the source 132. The core 168 also saturates before the cores 186 and 188 in the negative half cycles of voltage from the source 132 since the latter cores receive energy only from the line voltage until after the saturation of the core 168 in the negative half cycles.

When a signal is produced by the source 136, it produces a flow of current through the windings 128 and 130. The current causes volt-seconds to be introduced differentially by the windings 128 and 130 to the cores 104 and 106. This differential introduction of volt-seconds to the cores 104 and 106 in turn produces a temporal separation in the core saturations. The core 104 saturates before the core 106 in the positive half cycles of voltage from the source 132 and upon the simultaneous occurrence of a positive signal from the source 136. The core 104 saturates before the core 106 since the currents flow downwardly in Figure 4 through both of the windings 112 and 128 and introduce volt-seconds of the same polarity to the core. However, the current flowing through the winding 130 introduces volt-seconds to the core 106 in an opposite direction to the volt-seconds introduced to the core by the flow of current through the winding 113.

As previously described, the core 108 has already saturated in each positive half cycle of voltage from the source 132 at the time that the first one of the cores 104 and 106 saturates. When the core 108 saturates, it produces a flow of current through a control circuit including the diodes 140, 142, 144 and 146, as described fully above. This causes the voltage on the cathode of the diode 140 to be equal to the voltage on the cathode of the diode 144. Because of the equal voltages on the cathodes of the diodes 140 and 144, the impedance between these terminals is relatively low. This causes current to flow through an output circuit upon the saturation of the core 104 and as a result of the voltage induced in the winding 122. The ouput circuit includes the winding 122, the diode 146, the windings 150 and 152, the windings 124 and 126, the diode 140, the windings 158 and 156 and the winding 120.

The input current flowing through the windings 156 and 158 causes volt-seconds to be introduced differentially to the cores 186 and 188 relative to the introduction of volt-seconds from the currents flowing through the line windings 178 and 180. Because of this differential introduction of volt-seconds, a temporal separation is produced in the saturation of the cores 188 and 186. In the positive half cycles of voltage from the source 132, the volt-seconds introduced to the core 188 by the flow of current in the windings 158 and 180 are in the same direction for a positive signal from the source 136. This direction would be upwardly in Figure 4. However, the current flowing through the winding 178 would be in a downward direction in Figure 4 while the current through the winding 156 would be in an upward direction. For this reason, the core 188 saturates before the core 186 in the positive half cycles of voltage from the source 132.

As previously described, the core 166 has already saturated in the positive half cycles of voltage at the time that the core 188 saturates. Since the core 166 has already saturated in the positive half cycles of voltage from the source 132, current flows through a control circuit including the windings 174 and 176 and the diodes 194 and 196 or the diodes 198 and 200. Since currents of equal amplitudes flow through the diodes 194 and 198, equal voltages are produced on the cathodes of the diodes. In this way, relatively little impedance is produced between the cathodes of the diodes 194 and 198.

Because of the low impedance between the cathodes of the diodes 194 and 198, output current flows through a circuit including the winding 182, the diode 200, the windings 204 and 202, the windings 176 and 174, the diode 194, the windings 212 and 214 and the winding 184. The flow of current through the windings 212 and 214 produces a temporal separation in the saturation of the cores 216 and 218. In this way, the output from the main amplifier 164 is introduced as an input signal to the main amplifier 220 to control the production of an output signal by the main amplifier 220.

The core 106 saturates before the core 104 upon the occurrence of negative half cycles of voltage from the source 132 and positive signals from the source 136. Negative half cycles of voltage from the source 132 are represented by a relatively high voltage on the right terminal of the source 132 in Figure 4, and positive signals from the source 136 are represented by relatively high voltages on the upper terminal of the source in Figure 4. At the time that the core 106 saturates in the negative half cycles of voltage from the source 132, the core 115 has already saturated. The resultant flow of current upon the saturation of the core 115 causes equal voltages to be produced at the cathodes of the diodes 140 and 144 and a relatively low impedance to be provided between these terminals. This causes the voltage induced in the winding 120 to produce a flow of current through an output circuit including the windings 120 and 122, the diode 146, the windings 150 and 152, the windings 124 and 126, the diode 140 and the windings 158 and 156. The current flows through the windings 158 and 156 in an upward direction in Figure 4.

The current flowing through the winding 156 is in the same direction as the line current flowing through the winding 178 in the negative half cycles of voltage from the source 132. However, the current flowing through the winding 158 is in an opposite direction to the line current flowing through the winding 180. This causes the core 186 to saturate before the core 188. Upon the saturation of the core 186, the voltage induced in the winding 184 produces a flow of current through an output circuit including the windings 184 and 182, the diode 200, the windings 204 and 202, the windings 176 and 174, the diode 194 and the windings 212 and 214. This current is instrumental in introducing volt-seconds on a differential basis to the main amplifier 220 in the next stage. In this way, the main amplifier 220 can operate in conjunction with the switching amplifier 210 to produce an amplified output signal across a load such as the resistance 62 in Figure 1.

It will be seen from the above discussion that means are provided for insuring that one of the cores in each switching amplifier saturates before either of the cores in an associated main amplifier in each half cycle of line voltage. This initial saturation of a proper one of the cores in the switching amplifier occurs in the first stage and all subsequent stages of a multistage unit. In the first stage, the initial saturation of one of the switching cores can be obtained by the inclusion of shunt paths such as that formed in Figure 1 by the diode 50 and the resistance 52 and by the diode 54 and the resistance 56. By including such shunt paths, an initial saturation of one of the cores in the switching amplifier is obtained regardless of the polarity of the line voltage or of the signal voltage.

It will be further seen from the above discussion that a number of magnetic amplifier stages can be connected in cascade arrangement such that the output from each stage is introduced to the input of the next stage. In such an arrangement, each stage after the first stage has a control circuit which introduces volt-seconds differentially to control windings included in a switching amplifier in the next stage. For example, the second stage shown in Figure 4 has a pair of control windings 150 and 152 which are included in the switching amplifier 162. By such an arrangement, one of the cores in the switching amplifier of each stage is saturated before either of the cores in the associated main amplifier. This prior saturation occurs in each half cycle of line voltage regardless of the polarity of the input signal introduced to the main amplifier in the stage.

It will also be seen that each stage in a cascade arrangement produces an output signal in each half cycle of line voltage. The output signal is produced regardless of the polarity of the input signal introduced to the stage. The polarity of the output signal in each half cycle of line voltage is dependent upon the polarity of the input signal introduced to the stage. The output signal has a maximum power level since none of the input signal can be lost by a late saturation of the cores in the switching amplifier. This is especially important when the input signals have a low amplitude or a short duration. The reason is that part or all of the input signal might be lost if one of the cores in each switching amplifier did not initially saturate. The lost part of the signal might be required to produce an output signal having sufficient power to operate an output member such as a gun or a cutting tool.

The system shown in Figure 4 and described above has another advantage. This results from the fact that current flows through a circuit including the winding 126, the diodes 140 and 142 or the diodes 144 and 146, the windings 150 and 152 and the winding 124 when one of the cores 108 and 110 has saturated in a half cycle. The flow of current through this circuit has been described in detail previously. The flow of current through this circuit causes volt-seconds to be introduced on a differential basis to the cores 166 and 168 from the windings 150 and 152 relative to the introduction of volt-seconds to the cores from the windings 170 and 172.

Becuase of the introduction of differential volt-seconds to the cores 166 and 168 from the windings 150 and 152, differential volt-seconds do not have to be introduced to the cores 166 and 168 from the main amplifier 164 to set the cores for proper operation in each half cycle of line voltage. Since the main amplifier 164 does not have to introduce differential volt-seconds to the switching amplifier 162, not as many turns are needed in the windings of the main amplifier as might otherwise be necessary. By decreasing the number of turns in the windings of the main amplifier 164 an increase is obtained in the volt-seconds introduced to the windings 156 and 158 of the amplifier. This in turn causes an increased gain to be obtained in the output from the amplifier.

We claim:

1. A magnetic power amplifier, including, a first pair of saturable cores, a second pair of saturable cores, a first pair of windings disposed on the cores in the first pair, a second pair of windings disposed on the cores in the second pair, cyclically operable means including means simultaneously exposing said cores to flux produced by an alternating line current and connected in a circuit with the line windings in the first and second pairs for alternately producing core saturation initially in one direction and then in the opposite direction, means for effectng a temporal separation in the saturation of the cores in the first pair including circuit means coupled to the line windings for exposing the cores to flux produced by a signal current, circuit means coupled to the line windings for effecting a temporal separation in the saturation of the cores in the second pair and a saturation of a particular core in the second pair before any saturation of either core in the first pair in each half cycle from the cyclically operable means, the particular core in the second pair being dependent upon the polarity of the output from the cyclically operable means, a load, unidirectional means, and circuit means including the load and the unidirectional means and coupled electrically to the line windings in the first and second pairs for operating in synchronism with the saturation of at least one of the cores in the first and second pairs to control the delivery of output current in successive half cycles until the saturation of the other core in the first pair in those half cycles.

2. A magnetic power amplifier, including, a first pair of saturable cores, a second pair of saturable cores, a first pair of line windings magnetically coupled to the first pair of cores, a second pair of line windings magnetically coupled to the second pair of cores, a pair of control windings coupled to the line windings in the first pair, cyclically operable means including electrical circuitry connected to the line windings for producing a flow of line current through the line windings to alternately obtain core saturations initially in one direction and then in the opposite direction in successive half cycles; means for producing a saturation of one of the cores in the first pair before a saturation of the other core in the first pair including electrical circuitry connected to the control windings for exposing the cores to flux produced by a signal current, means including electrical circuitry coupled to the line windings in the second pair for obtaining in half cycles of a first polarity a saturation of a particular one of the cores in the second pair before the saturation of the other core in the pair and before the saturation of either core in the first pair and for obtaining in half cycles of a second polarity a saturation of the other core in the second pair before the saturation of the particular core in the pair and before the saturation of either core in the first pair, a load, unidirectional means, and circuit means including the load and the unidirectional means and coupled to the line windings for providing for the delivery of output current to the load in each half cycle upon the saturation of one of the cores in the first pair and until the saturation of the other core in the pair in each half cycle.

3. A magnetic amplifier, including, a plurality of saturable cores, a plurality of line windings each being magnetically associated with a different core, means including electrical circuitry electrically coupled to the line windings for introducing cyclic line voltage to each of the line windings to produce a saturation of the cores in successive half cycles, means including electrical circuitry electrically coupled to the line windings for providing for the introduction of cyclic line voltage differentially to first pairs of line windings in the plurality to produce a saturation of one of the windings in each of the first pairs before any saturation of the other core in the pair and before any saturation of either core in second pairs associated with the first pairs, the particular one of the cores receiving the prior saturation in each one of the first pairs being dependent upon the polarity of the line voltage, means including electrical circuitry electrically coupled to the line windings for introducing signal energy differentially to the second pairs of line windings in the plurality relative to the introduction of line voltage to the line windings to produce a temporal separation of the core saturations in each pair in successive half cycles of line voltage, and an output circuit including a load and electrically coupled to the line windings to produce an output signal in the load during each temporal separation in core saturations of the second pairs.

4. A magnetic amplifier including, a plurality of saturable cores, a plurality of line windings each being magnetically associated with a different one of the cores, means including electrical circuitry for providing for the introduction of cyclic line voltage to the line windings, means including electrical circuitry electrically coupled to the line windings for introducing signal energy in opposite polarities to first pairs of line windings relative to the introduction of line voltage to the wndings to produce a saturation of one of the cores in each pair before any saturation of the other core in each pair, means including electrical circuitry electrically coupled to the line windings for providing for the introduction of a greater number of ampere-turns from line voltage to one of the windings in each of second pairs in the plurality than to the other line winding in each pair, in accordance with the polarity of the line voltage, to produce a temporal separation between the saturation of the cores in each of the second pairs and a saturation of one of the cores in each of the second pairs before the saturation of either of the cores in an associated one of the first pairs, and output circuitry including a load and electrically coupled to the line windings to provide a low impedance in the output circuit upon the saturation of one of the cores in each of the first pairs for the delivery of an output current in the load until the saturation of the other core in the pair.

5. A magnetic amplifier, including, a first pair of saturable cores, a first pair of line windings disposed in magnetic proximity to the cores, a second pair of saturable cores, a second pair of line windings disposed in magnetic proximity to the second pair of cores, signal means coupled electrically to the second pair of windings for differentially producing flux in the second pair of cores to provide a saturation of one of the cores in the pair before any saturation of the other core in the pair, cyclically operable means including circuit means electrically coupled to the line windings in the first and second pairs for simultaneously exposing the cores to flux produced by an alternating line current for alternately producing core saturations initially in one direction and then in the other, circuit means coupled electrically to at least the first pair of windings for differentially exposing the cores in the first pair to flux produced by the alternating line current to produce a temporal separation in the saturation of the cores in the pair for the prior saturation of a particular one of the cores in the pair dependent upon the polarity of the line voltage and before the saturation of either core in the second pair and regardless of the polarity of the signal energy introduced to the windings, unidirectional means, a load, and circuit means including the load and the unidirectional means and electrically coupled to the line windings for providing a relatively low impedance to the load upon the saturation of one of the cores in the second pair for the delivery of output current through the load until the saturation of the other core in the second pair.

6. A magnetic amplifier, including, a first pair of saturable cores, a second pair of saturable cores, a first pair of line windings each being magnetically associated with a different one of the cores in the first pair, a second pair of line windings each being magnetically associated with a different one of the cores in the second pair, a first pair of output windings each being magnetically associated with a different one of the cores in the first pair, a second pair of output windings each being magnetically associated with a different one of the cores in the second pair, means including electrical circuitry electrically coupled to the line windings for introducing cyclic line voltage to the line windings to drive toward saturation the cores associated with the line windings, means electrically coupled to the line windings in the second pair for introducing cyclic line voltage differentially to the line windings in the second pair to produce a saturation of one of the cores in the pair before the saturation of the other core in the pair in each cyclic swing of voltage and a saturation of a particular one of the cores in the pair in accordance with the polarity of the line voltage and before any saturation of either core in the first pair, means including electrical circuitry electrially coupled to the line windings for introducing signals of opposite polarities to the line windings in the second pair relative to the polarities of the cyclic line voltages introduced to the windings to produce a saturation of one of the cores in the pair before any saturation of the other core in the pair, a load, unidirectional means, and an output electrical circuit including the load, the unidirectional means and the output windings in the first and second pairs for delivering output current to the load upon the saturation of one of the cores in the second pair and until the saturation of the other core in the pair.

7. A magnetic power amplifier, including, a first pair of saturable cores, a first pair of line windings each being magnetically associated with a different core in the first pair, a second pair of saturable cores, a second pair of line windings each being magnetically associated with a different core in the second pair, electrical circuit means electrically coupled to the second pair of windings for introducing signal energy differentially to the second pair of line windings relative to the introduction of line voltage to the windings to produce a temporal separation of the core saturations in the second pair during successive half cycles of line voltage, electrical circuit means electrically coupled to the line windings for providing for the introduction of cyclic line voltage to the line windings, the last mentioned means including first unidirectional means each electrically coupled to a different one of the line windings in the first pair in opposed relationship to the unidirectional means electrically coupled to the other line winding in the first pair for obtaining a saturation of a particular one of the cores in the first pair before any of the other cores, the particular one of the cores in the first pair being dependent upon the polarity of the cyclic line voltage, and an output electrical circuit including a first electrical load and including second unidirectional means and electrically coupled to the line windings in the first and second pairs for producing power amplification of the signal energy in the load during the temporal separation of the core saturations in the second pair.

8. A magnetic amplifier including, a first pair of saturable cores, a first pair of line windings each being magnetically associated with a different core in the first pair, a first pair of output windings each being magnetically associated with a different core in the first pair, a second pair of saturable cores, a second pair of line windings each being magnetically associated with a different core in the second pair, a second pair of output windings each being magnetically associated with a different core in the second pair, circuit means electrically coupled to the line windings for providing for the introduction of alternating line voltage to the line windings in each pair, circuit means includng a pair of first unidirectional members connected to each other in opposing relationship and connected to the line windings in the first pair to provide a higher impedance across one of the windings in the pair than across the other winding in the pair for the saturation of a particular one of the cores in the first pair before the saturation of the other core in the first pair and before the saturation of either core in the second pair, the particular one of the cores in the first pair alternating in successive half cycles in accordance with the alternations in the polarity of the line voltage, circuit means electrically coupled to the line windings for introducing signal energy differentially to each pair of line windings relative to the introduction of line voltage to the windings to produce a temporal separation of the core saturations in each pair during successive half cycles of line voltage, second unidirectional means, a load, and an output circuit including the second unidirectional means, the load and the first and second pairs of output windings for producing across the load power amplification of the signal energy during the temporal separation of the core saturations in the second pair.

9. A magnetic amplifier, including, a first pair of saturable cores, a second pair of saturable cores, a first pair of line windings each being magnetically associated with a different one of the cores in the first pair, a first pair of input windings each being magnetically associated with a different one of the cores in the first pair, a first pair of output windings each being magnetically associated with a different one of the cores in the first pair, a second pair of line windings each being magnetically associated with a different one of the cores in the second pair, a second pair of output windings each being magnetically associated with a different one of the cores in the second pair, means including electrical circuitry for introducing alternating line voltage to each of the line windings, means including first undirectional and impedance means connected in an electrical circuit across a first one of the line windings in the second pair to produce a relatively low impedance across the line winding in alternating voltages of a first polarity and a high impedance across the line winding in alternating voltages of a second polarity opposite to the first polarity, means including second unidirectional and impedance means connected in an electrical circuit across the second line winding in the second pair in opposed relationship to the connections made to the first unidirectional and impedance means to produce a relatively low impedance across the line winding in alternating voltages of the second polarity and a high impedance across the line winding in alternating voltages of the first polarity, the unidirectional and impedance means being connected to obtain in alternating voltages of the first polarity a saturation of the first core in the second pair before any saturation of any of the other cores and in alternating voltages of the second polarity a saturation of the second core in the second pair before a saturation of any of the other cores, means including electrical circuitry electrically coupled to the input windings for introducing signals of opposite polarities to the input windings in the first pair relative to the introduction of line voltage to the windings to produce a saturation of one of the cores in the first pair before the saturation of the other core in the pair, a load, third unidirectional means, and an output electrical circuit including the third unidirectional means, the load and the first and second pairs of output windings connected in series for producing an output current upon the saturation of one of the cores in the first pair and until the saturation of the other core in the pair.

10. A magnetic amplifier, including, a first pair of saturable cores, a second pair of saturable cores, a pair of control windings each being magnetically associated with a different core in the first pair, a first pair of line windings each magnetically associated with a different core in the first pair, a second pair of line windings each magnetically associated with a different core in the second pair, cyclically operable means including electrical circuit means electrically coupled to the line windings for applying alternating line current to the line windings to alternately produce core saturations initially in one direction and then in the opposite direction, electrical circuit means including the control connected in a differential relationship with respect to the connections to the line windings in the first pair for controlling the introduction of alternating line current to the line windings to produce a saturation of a particular one of the cores in the first pair before any saturation of the other cores for line current in the first direction and to produce a saturation of the second core in the first pair before any saturation of the other cores for line current in the second direction, means for effecting a temporal separation of the saturation of the cores in each pair including electrical circuit means coupled to the line windings on a differential basis relative to the introduction of line current to the windings for exposing the cores to flux produced by a signal current, a load, unidirectional means, and electrical circuit means including the load and the control windings and the unidirectional means and electrically coupled to the line windings for operating in synchronism with the saturation of at least one of the cores in the second pair to obtain the delivery of output current to the load until the saturation of the other core in the second pair.

11. A magnetic amplifier, including, a first pair of saturable cores, a first pair of line windings each being magnetically associated with a different core in the first pair, a first pair of output windings each being magnetically associated with a different core in the first pair, a pair of control windings each being magnetically associated with a different core in the first pair, a second pair of saturable cores, a second pair of line windings each being magnetically associated with a different core in the second pair, a second pair of output windings each being magnetically associated with a different core in the second pair, electrical circuit means electrically coupled to the line windings in each pair for providing for the introduction of alternating line voltage to the line windings in each pair, electrical circuit means including the control windings for providing for the introduction of line voltage dfferentially to the control windings for the saturation of a first one of the cores in the first pair before any of the other cores in the first and second pairs for line voltage of a first polarity and for the saturation of the second core in the first pair before any of the other cores in the first and second pairs for line voltage of a second polarity opposite to the first polarity, electrical circuit means electrically coupled to the line windings for introducing signal energy differentially to the line windings in each pair relative to the introduction of line voltage to the windings to produce a saturation of one of the cores in the second pair before a saturation of the other core in the pair during successive half cycles of line voltage, and an electrical output circuit including unidirectional means and a load connected to the output windings in the first and second pairs to produce power amplification in the load of the signal energy in each half cycle of line voltage and for producing such power amplification upon the saturation of one of the cores in the second pair and until the saturation of the other core in the pair.

12. A multi-stage magnetic amplifier, including, a plurality of saturable cores, a plurality of line windings each being magnetically associated with a different core in the plurality, electrical circuitry for connecting pairs of line windings to obtain a pairing of cores in accordance with the pairing of line windings, electrical circuitry electrically coupled to the line windings for introducing alternating line voltage to the windings to produce core saturations, electrical circuitry electrically coupled to the line windings for providing for the saturation of a first core in a first pair before the saturation of any other core for alternating line voltage of a particular polarity and for the saturation of the second core in the first pair before the saturation of any other core for alternating line voltage of an opposite polarity, electrical circuitry electrically coupled to the line windings for introducing signal energy differentially to the cores in a second pair relative to the introduction of line voltage to produce a temporal separation in the core saturations in the pair, a plurality of control windings each being magnetically associated with a different one of the cores, a plurality of unidirectional means, a plurality of output circuits each coupling the output of a first one of the stages to the input of the next stage in accordance with the operation of a pair of cores associated with the first stage and each including a different unidirectional means in the plurality and each coupled electrically to the line windings associated with the cores in the first stage and each controlled by the saturation of the associated cores in the first stage to produce a power amplification of the signal energy upon the saturation of one of the cores in the first stage and until a saturation of the other core in the stage to introduce the amplified signal energy differentially to the pair of cores in the next stage relative to the introduction of line voltage for the production of a temporal separation of core saturations in the next stage, the cores and windings for each stage being provided with characteristics to produce an initial core saturation in the stage for each half cycle of line voltage only after an initial core saturation in the previous stage for the half cycle, and a plurality of control circuits each coupled electrically to a different output circuit and to the line windings associated with that output circuit and coupling the output from one control circuit to the input of the next control circuit and each including the control windings magnetically associated with the pair of cores in the next control circuit and each including different control means in the plurality to produce in each circuit for alternating line voltage of a particular polarity a saturation of a first core associated with the output circuit before the saturation of any other core associated with the output circuit or with successive output circuits and for alternating line voltage of an opposite polarity a saturation of a second core associated with the output circuit before the saturation of any cores associated with the output circuit or with successive output circuits, one of the control circuits being connected to become operative upon the saturation of one of the cores in the first pair and until the saturation of the other core in the pair and the other control circuits being connected to become operative upon the saturation of one of the cores controlling the output from the previous control circuit.

13. A magnetic amplifier including, a first pair of saturable cores, a first pair of line windings each being magnetically coupled to a different core in the first pair, a first pair of output windings each being magnetically coupled to a different core in the first pair, a second pair of saturable cores, a second pair of line windings each being magnetically associated with a different core in the second pair, a second pair of output windings each being magnetically associated with a different core in the second pair, means including electrical circuitry electrically coupled to the line windings for providing for the introduction of alternating line voltage to the line windings in each pair to drive toward saturation the cores magnetically coupled to the line windings, means including electrical circuitry electrically coupled to the line windings in the first pair for providing for the introduction of a greater amount of ampere-turns from the line voltage to a particular one of the cores in the first pair than to the other core in the first pair or to either of the cores in the second pair to produce an initial saturation of the particular core in each alternation of line voltage, the particular core in the first pair being dependent upon the polarity of the alternating line voltage, means including electrical circuitry electrically coupled to the second pair of line windings for introducing signal energy differentially to the second pair of line windings relative to the introduction of line voltage to the windings to produce a temporal separation of the core saturations in the second pair during successive half cycles of line voltage, and an output circuit including unidirectional means and a load and the first and second pairs of output windings connected in a series relationship for producing power amplification in the load of the signal energy during the temporal separation of the core saturations in the second pair.

No references cited.